US010270699B2

(12) United States Patent
John et al.

(10) Patent No.: US 10,270,699 B2
(45) Date of Patent: Apr. 23, 2019

(54) AUTOMATED FLOW DEVOLVEMENT IN AN AGGREGATE FLOW ENVIRONMENT

(71) Applicant: Telefonaktiebolaget L M Ericsson (publ), Stockholm (SE)

(72) Inventors: Wolfgang John, Arsta (SE); Catalin Meirosu, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 66 days.

(21) Appl. No.: 15/329,955

(22) PCT Filed: Jul. 28, 2014

(86) PCT No.: PCT/SE2014/050909
§ 371 (c)(1),
(2) Date: Jan. 27, 2017

(87) PCT Pub. No.: WO2016/018181
PCT Pub. Date: Feb. 4, 2016

(65) Prior Publication Data
US 2017/0264557 A1    Sep. 14, 2017

(51) Int. Cl.
*H04L 12/851* (2013.01)
*H04L 12/26* (2006.01)
(Continued)

(52) U.S. Cl.
CPC ........ *H04L 47/2483* (2013.01); *H04L 43/026* (2013.01); *H04L 43/0835* (2013.01);
(Continued)

(58) Field of Classification Search
CPC ... H04L 47/2483; H04L 43/026; H04L 47/28; H04L 45/38; H04L 43/0835;
(Continued)

(56) References Cited

U.S. PATENT DOCUMENTS 6,854,117 B1    2/2005  Roberts
6,977,932 B1 *  12/2005 Hauck ................. H04L 12/4633
                                                        370/392
(Continued)

FOREIGN PATENT DOCUMENTS

EP       1672834 A1    6/2006
WO    2016018181 A1    2/2016

OTHER PUBLICATIONS

Author Unknown, "OpenFlow Switch Specification," ONF TS-007, Version 1.3.1, Sep. 6, 2012, Open Networking Foundation, pp. 1-128.
(Continued)

*Primary Examiner* — Jung Liu
(74) *Attorney, Agent, or Firm* — Withrow & Terranova, PLLC

(57) ABSTRACT

Mechanisms for devolving microflows from aggregate flows are disclosed. An ingress node receives a packet that matches an aggregate flow entry in a flow table. A determination that a devolve action is associated with the aggregate flow entry is made. Based on the determination that the devolve action is associated with the aggregate flow entry, a microflow flow entry is generated in the flow table to define a microflow. The microflow flow entry includes header information extracted from the packet. Microflow generation information that identifies the microflow is sent to a controller node. It is determined that the microflow has timed out based on an idle timeout period of time. In response to determining that the microflow has timed out, microflow termination information that includes path measurement metric information associated with the microflow is sent to the controller node.

22 Claims, 12 Drawing Sheets

(51) Int. Cl.
*H04L 12/715* (2013.01)
*H04L 12/721* (2013.01)
*H04L 12/841* (2013.01)
*H04L 12/24* (2006.01)

(52) U.S. Cl.
CPC .......... *H04L 43/0858* (2013.01); *H04L 43/18* (2013.01); *H04L 45/38* (2013.01); *H04L 45/64* (2013.01); *H04L 47/28* (2013.01); *H04L 41/0206* (2013.01); *H04L 41/0213* (2013.01); *Y02D 50/30* (2018.01)

(58) Field of Classification Search
CPC ..... H04L 43/0858; H04L 43/18; H04L 45/64; H04L 41/0213; H04L 41/0206; Y02D 50/30
See application file for complete search history.

(56) References Cited

U.S. PATENT DOCUMENTS

| | | | |
|---|---|---|---|
| 7,012,919 B1* | 3/2006 | So | H04L 41/5019 370/235 |
| 8,848,718 B2 | 9/2014 | Hussain et al. | |
| 8,868,775 B2 | 10/2014 | Filsfils et al. | |
| 9,973,445 B2* | 5/2018 | Zhang | H04L 49/25 |
| 2003/0037042 A1* | 2/2003 | Kametani | G06F 17/30952 |
| 2010/0158009 A1 | 6/2010 | Lee et al. | |
| 2013/0064079 A1 | 3/2013 | Zhang | |
| 2014/0112187 A1 | 4/2014 | Kang et al. | |
| 2015/0036498 A1 | 2/2015 | Ehara | |

OTHER PUBLICATIONS

Author Unknown, "OpenFlow Switch Specification," ONF TS-012, Version 1.4.0, Oct. 14, 2013, Open Networking Foundation, pp. 1-206.
Barford, Paul, et al., "Comparing Probe- and Router-Based Packet-Loss Measurement," IEEE Internet Computing, vol. 8, Issue 5, Sep.-Oct. 2004, IEEE, pp. 2-8.
Casado, Martin, et al., "Fabric: A Retrospective on Evolving SDN," Proceedings of the first workshop on Hot topics in software defined networks (HotSDN'12), Aug. 13, 2012, Helsinki, Finland, ACM, 5 pages.
Castrucci, Marco, et al., "Extension of the OpenFlow framework to foster the Software Defined Network paradigm in the Future Internet," GARR Conference, Nov. 8-10, 2011, Bologna, Italy, Publisher Unknown, 12 pages.
Curtis, Andrew R., et al., "DevoFlow: Scaling Flow Management for High-Performance Networks," Proceedings of the ACM SIGCOMM 2011 conference (SIGCOMM'11), Aug. 15-19, 2011, Toronto, Ontario, Canada, ACM, 12 pages.
Gourov, Vassil Nikolaev, "Network Monitoring with Software Defined Networking: Towards OpenFlow network monitoring," Master of Science Thesis, Delft University of Technology, Aug. 30, 2013, Vassil Nikolaev Gourov, 75 pages.
John, Wolfgang, et al., "Low-overhead packet loss and one-way delay measurements in Service Provider SDN," Open Networking Summit 2014: Research Track, Mar. 2-4, 2014, Santa Clara, California, USENIX, 2 pages.
Katz, Dave, et al., "Bidirectional Forwarding Detection (BFD)," Internet Engineering Task Force (IETF), Request for Comments: 5880, Category: Standards Track, Jun. 2010, IETF Trust, pp. 1-49.
Khurshid, Ahmed, et al., "VeriFlow: Verifying Network-Wide Invariants in Real Time," 10th USENIX Symposium on Networked Systems Design and Implementation (NSDI '13), Apr. 2-5, 2013, Lombard, Illinois, USENIX Association, pp. 15-27.
Mattos, Diogo M. F., et al., "OMNI: OpenFlow MaNagement Infrastructure," International Conference on the Network of the Future (NOF), Nov. 28-30, 2011, IEEE, 5 pages.
Narayana, Srinivas, et al., "Compiling Path Queries," Proceedings of the 13th USENIX Symposium on Networked Systems Design and Implementation (NSDI '16), Mar. 16-18, 2016, Santa Clara, California, USENIX Association, 17 pages.
Narayana, Srinivas, et al., "Compiling Path Queries in Software-Defined Networks," Proceedings of the third workshop on Hot topics in software defined networking (HotSDN'14), Aug. 22, 2014, Chicago, Illinois, ACM, 6 pages.
Reitblatt, Mark, et al., "Consistent Updates for Software-Defined Networks: Change You Can Believe In!" Proceedings of the Twelfth ACM Workshop on Hot Topics in Networks (Hotnets '11), Nov. 14-15, 2011, Cambridge, Massachusetts, ACM, 6 pages.
Yiakoumis, Yiannis, et al., "Dynamic Flow Aggregation on an OpenFlow Network," Stanford University, Date Unknown, archive. openflow.org/wk/images/4/49/OpenFlow-Sigcomm-Aggregation. pdf, NSF, Cisco, Deutsche Telekom, DoCoMo, Ericsson, NEC and Xilinx, 1 page.
Yu, Curtis, et al., "FlowSense: Monitoring Network Utilization with Zero Measurement Cost," Proceedings of the 14th international conference on Passive and Active Measurement (PAM'13), Mar. 18-19, 2013, Hong Kong, China, Springer-Verlag, 10 pages.
International Search Report and Written Opinion for International Patent Application No. PCT/SE2014/050909, dated Feb. 16, 2015, 9 pages.
Mogul, Jeffrey C. et al., "DevoFlow: Cost-Effective Flow Management for High Performance Enterprise Networks," Proceedings of the 9th ACM SIGCOMM Workshop on Hot Topics in Networks (Hotnets), Article No. 1, Oct. 20-21, 2010, Monterey, California, ACM, 6 pages.
Author Unknown, "SDN architecture," Issue 1.1, 2016, Open Networking Foundation, pp. 1-59.
Hong, James Won-Ki, "Tu18: Internet Traffic Monitoring and Analysis: Methods and Applications," IEEE Global Telecommunications Conference (GLOBECOM), Nov. 29-Dec. 3, 2004, Dallas, Texas, USA, IEEE, 63 pages.
Extended European Search Report for European Patent Application No. 17163991.7, dated Sep. 26, 2017, 8 pages.
Non-Final Office Action for U.S. Appl. No. 15/146,318, dated Dec. 11, 2018, 21 pages.
Examination Report for European Patent Application No. 17163991. 7, dated Feb. 25, 2019, 5 pages.

* cited by examiner

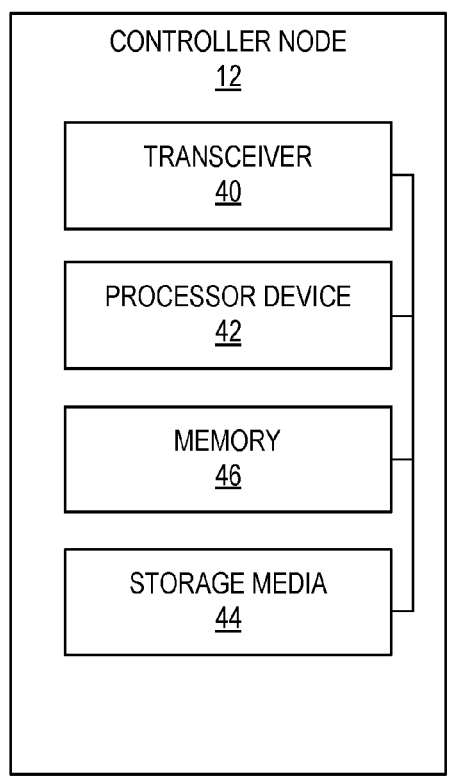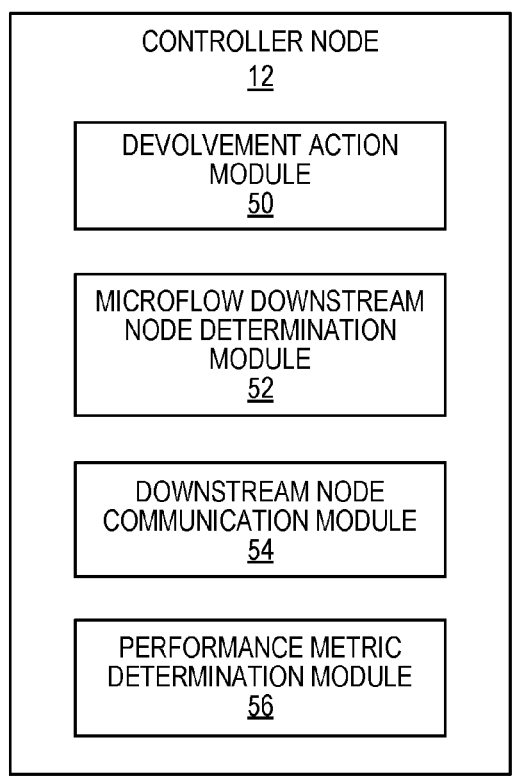
FIG. 9
FIG. 10

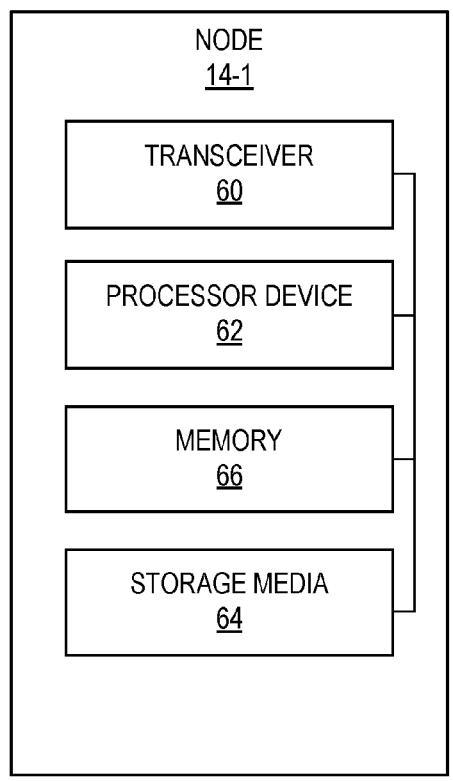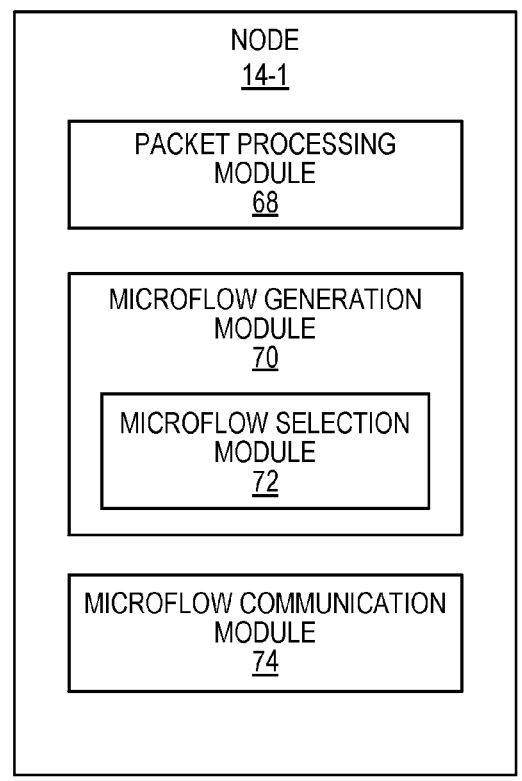
FIG. 11
FIG. 12

AUTOMATED FLOW DEVOLVEMENT IN AN AGGREGATE FLOW ENVIRONMENT

This application is a 35 U.S.C. § 371 national phase filing of International Application No. PCT/SE2014/050909, filed Jul. 28, 2014, the disclosure of which is incorporated herein by reference in its entirety.

TECHNICAL FIELD

The embodiments relate generally to routing packets through a network, and in particular, to mechanisms for devolving flows automatically in an aggregate flow environment, and to determining path measurement metrics associated with a respective devolved flow.

BACKGROUND

There is increasing interest in moving control and intelligence from individual switching, routing, and bridging network nodes to a fewer number of controller nodes. Such networking architectures will be referred to herein generally as centralized control plane networking architectures and are exemplified, for example, by a software-defined network (SDN). An SDN is one example of a network architecture wherein a forwarding plane (sometimes referred to as a data plane) and a control plane, which are conventionally implemented in a single network node, are separated and implemented in two distinct network nodes. Such distinct network nodes may be referred to as a datapath node and a controller node, respectively. An example of an SDN architecture, or specification, is the OpenFlow Switch Specification, version 1.4 ("OpenFlow").

Theoretically, by separating the forwarding function and the control function into different network nodes, multiple relatively inexpensive datapath nodes may be coupled together and controlled by a single controller node, resulting in a lower overall network cost. Another potential advantage of a centralized control plane networking architecture (CCPNA) is that a single controller node can be more easily programmed to implement new network functionality than would be possible by programming multiple conventional network nodes that combine the control plane and the forwarding plane, thereby simplifying the implementation of additional networking functions in the network.

When a new flow between a source node and a destination node is originated in a CCPNA, an ingress datapath node typically informs the controller node about the new flow so that a path through the network may be determined. The controller node determines an appropriate path through the network, and the controller node then sends packet-forwarding commands to the datapath nodes in the path so that each datapath node can install a flow entry into a flow table that pertains to that particular flow, and indicates where packets associated with the new flow are to be forwarded. This path setup process takes time, relatively substantial controller node processing, and network bandwidth, but provides high-granularity routing through the network.

In some environments however, such as a service provider environment, the number of new flows that are continually initiated may be prohibitive to setup individually. To solve this problem, the datapath nodes may utilize one or more wildcard, sometimes referred to as aggregate, flow entries that group, or aggregate, what could be identified as many separate flows into a single flow entry. For example, an aggregate flow entry may direct that any flow initiated from any media access control (MAC) address, and/or which are destined for any MAC address, be forwarded through a certain port of the datapath node, without a need to communicate with the controller node.

Aggregate flow entries thus reduce communications between an ingress datapath node and a controller node, and reduce the processing requirements of the controller node, but at a loss of flow granularity. The loss of flow granularity can be undesirable however, for other purposes, such as when measuring path performance metrics. Path performance metrics, such as packet loss metrics, or packet delay metrics, become difficult or impossible at a desired level of granularity when multiple independent flows are aggregated together. For example, because each datapath node in a network may have different aggregate flow entries, as well as different non-aggregate flow entries, some flows that are part of an aggregate flow at an ingress datapath node may be split off from the aggregate flow prior to an aggregate flow entry at an egress datapath node, rendering many path performance metrics between the ingress datapath node and the egress datapath node meaningless.

One solution to this problem is an active measurement mechanism that injects trains of probe packets between two datapath nodes. However, such active measurement mechanisms increase traffic on the network, and require that at least some of the datapath nodes include active measurement functionality.

Known passive measurement techniques rely on the datapath nodes providing information about individual flows to the controller node, including, for example, messages from the datapath nodes when a flow is removed from a flow table. However, such messages are not generated when flows are aggregated via aggregate flow entries, and thus, such techniques are not useful for aggregate flows. Maintaining the scalability and flexibility provided by aggregate flows, while still retaining the ability to gather performance measurement metrics on a more granular level would be desirable.

Another solution involves devolving every flow, and then informing the controller node about only those flows whose traffic exceeds a predetermined threshold. However, if the predetermined threshold is set too low, a great number of flows may be individually processed, reducing the advantages of aggregate flows. Moreover, there are no disclosed mechanisms for automatically providing flow performance metrics when a flow is terminated.

SUMMARY

The embodiments relate to the automated devolvement of flows, referred to herein as microflows, that would otherwise be a part of an aggregate flow, in an intelligent manner that reduces processor involvement of a controller node. The automated devolvement of flows may be used, for example, to facilitate path measurement metrics at a desired level of granularity, including, for example, packet loss metrics, and packet delay metrics.

In one embodiment, a method for notifying a controller node about a new microflow is provided. An ingress node receives a packet that matches an aggregate flow entry in a flow table. It is determined that a devolve action is associated with the aggregate flow entry. Based on determining that the devolve action is associated with the aggregate flow entry, a microflow flow entry is generated in the flow table to define a microflow. The microflow flow entry includes header information extracted from the packet and an idle timeout identifier that identifies an idle timeout period of time for the microflow flow entry. Microflow generation information that identifies the microflow is sent to the controller node. It is determined that the microflow has timed out based on the idle timeout period of time. In response to determining that the microflow has timed out, microflow termination information that includes path measurement metric information associated with the microflow is sent to the controller node.

In one embodiment, the ingress node receives a microflow selection criterion from the controller node, and the microflow flow entry is generated based on a determination that the devolve action is associated with the aggregate flow entry and based on the microflow selection criterion. In one embodiment, the microflow is monitored for a predetermined amount of time prior to sending the microflow generation information to the controller node. In one embodiment, the packet is buffered in a memory and released to a next node in the path upon receiving a path setup indication from the controller node indicating that a downstream node in a path the packet will traverse has been informed about the microflow.

In one embodiment, the ingress node and the egress node maintain path measurement metric information that comprises a count of packets in corresponding packet counters. After the ingress node and the egress node determine that an idle timeout period of time associated with the microflow has expired (i.e., the microflow has timed out), the ingress node and the egress node send the packet counters to the controller node for use in determining packet loss metrics associated with the microflow. In another embodiment, when the idle timeout expires, the ingress node and the egress node generate path measurement metric information that comprises timestamps, and send the timestamps to the controller node for use in determining packet delay metrics associated with the microflow.

In another embodiment, an apparatus is provided. The apparatus includes a transceiver that is configured to communicate with a network. A processor is coupled to the transceiver and is configured to receive a packet that matches an aggregate flow entry in a flow table, and to determine that a devolve action is associated with the aggregate flow entry. Based on a determination that the devolve action is associated with the aggregate flow entry, the processor generates a microflow flow entry in the flow table to define a microflow, the microflow flow entry including header information extracted from the packet. The processor sends microflow generation information that identifies the microflow to the controller node. Eventually, it is determined that the microflow has timed out based on the idle timeout period of time. In response to determining that the microflow has timed out, the controller node is sent microflow termination information that includes path measurement metric information associated with the microflow.

In another embodiment, a computer program product for notifying a controller node about a microflow is provided. The computer program product is stored on a non-transitory computer-readable storage medium and includes instructions configured to cause a processor device to carry out steps including receiving, by an ingress node, a packet that matches an aggregate flow entry in a flow table. A devolve action is associated with the aggregate flow entry. Based on a determination that the devolve action is associated with the aggregate flow entry, a microflow flow entry is generated in the flow table to define a microflow, the microflow flow entry including header information extracted from the packet and an idle timeout identifier that identifies an idle timeout period of time for the microflow flow entry. Microflow generation information that identifies the microflow is sent to the controller node. It is determined that the microflow has timed out based on the idle timeout period of time. In response to determining that the microflow has timed out, microflow termination information that includes path measurement metric information associated with the microflow is sent to the controller node.

In another embodiment, a method is provided wherein a controller node sends, to an ingress node, data that establishes a devolve action in association with an aggregate flow entry maintained at the ingress node. The controller node receives microflow generation information from the ingress node that identifies a microflow. At least one additional node in a path of the microflow from the ingress node to an egress node is determined. The controller node sends microflow setup information that identifies the microflow to the at least one additional node. After the microflow times out, first microflow termination information associated with the microflow is received from the ingress node, and second microflow termination information associated with the microflow is received from the at least one additional node. A path measurement metric is then determined in response to receiving the first microflow termination information and the second microflow termination information. In one embodiment, the microflow generation information includes an idle timeout identifier that identifies an idle timeout period of time that was received from the ingress node. In one embodiment, the controller node sends, to the ingress node, a microflow selection criterion that identifies a criterion for defining the microflow.

In one embodiment the controller node receives microflow termination information that includes a first packet counter identifying a first number of packets associated with the microflow received by the ingress node. The controller node also receives, from the at least one additional node, a second microflow termination information that includes a second packet counter identifying a second number of packets associated with the microflow received by the at least one additional node. The controller node determines a packet loss metric based on the first packet counter and the second packet counter.

In another embodiment the controller node receives, from the ingress node, first microflow termination information that includes a first timestamp. The controller node receives, from the at least one additional node, second microflow termination information that includes a second timestamp, and determines a packet delay metric based on the first timestamp and the second timestamp.

In another embodiment, a computer program product is provided. The computer program product is stored on a non-transitory computer-readable storage medium and includes instructions configured to cause a processor device to carry out the steps of sending, to an ingress node, data that establishes a devolve action in association with an aggregate flow entry maintained at the ingress node. The steps may further include receiving, by a controller node from the ingress node, microflow generation information that identifies a microflow, and determining at least one additional node in a path of the microflow from the ingress node to an egress node. The steps include sending the at least one additional node microflow setup information that identifies the microflow. The steps further include receiving, after the microflow times out, first microflow termination information associated with the microflow from the ingress node and second microflow termination information associated with the microflow from the at least one additional node. A path measurement metric is then determined in response to receiving the first microflow termination information and the second microflow termination information.

In another embodiment, an apparatus is provided. The apparatus includes a transceiver configured to communicate with a network. The apparatus also includes a processor coupled to the transceiver, the processor being configured to send, to an ingress node, data that establishes a devolve action in association with an aggregate flow entry maintained at the ingress node. The processor is also configured to receive, from the ingress node, microflow generation information that identifies a microflow. At least one additional node in a path of the microflow from the ingress node to an egress node is determined, and microflow setup information that identifies the microflow is sent to the at least one additional node. After the microflow times out, first microflow termination information associated with the microflow is received from the ingress node, and second microflow termination information associated with the microflow is received from the at least one additional node. A path measurement metric is then determined in response to receiving the first microflow termination information and the second microflow termination information. Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 is a block diagram of a controller node according to one embodiment;

FIG. 10 is a functional block diagram of a controller node according to one embodiment;

FIG. 11 is a block diagram of a node according to one embodiment; and

FIG. 12 is a functional block diagram of a node according to one embodiment.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments relate to the automated devolvement of flows, referred to herein as microflows, that would otherwise be part of an aggregate flow, in an intelligent manner that reduces processor involvement of a controller node. The automated devolvement of flows may be used, for example, to facilitate determination of path measurement metrics at a desired level of granularity, including, for example, packet loss metrics, and packet delay metrics.

Figure 1:
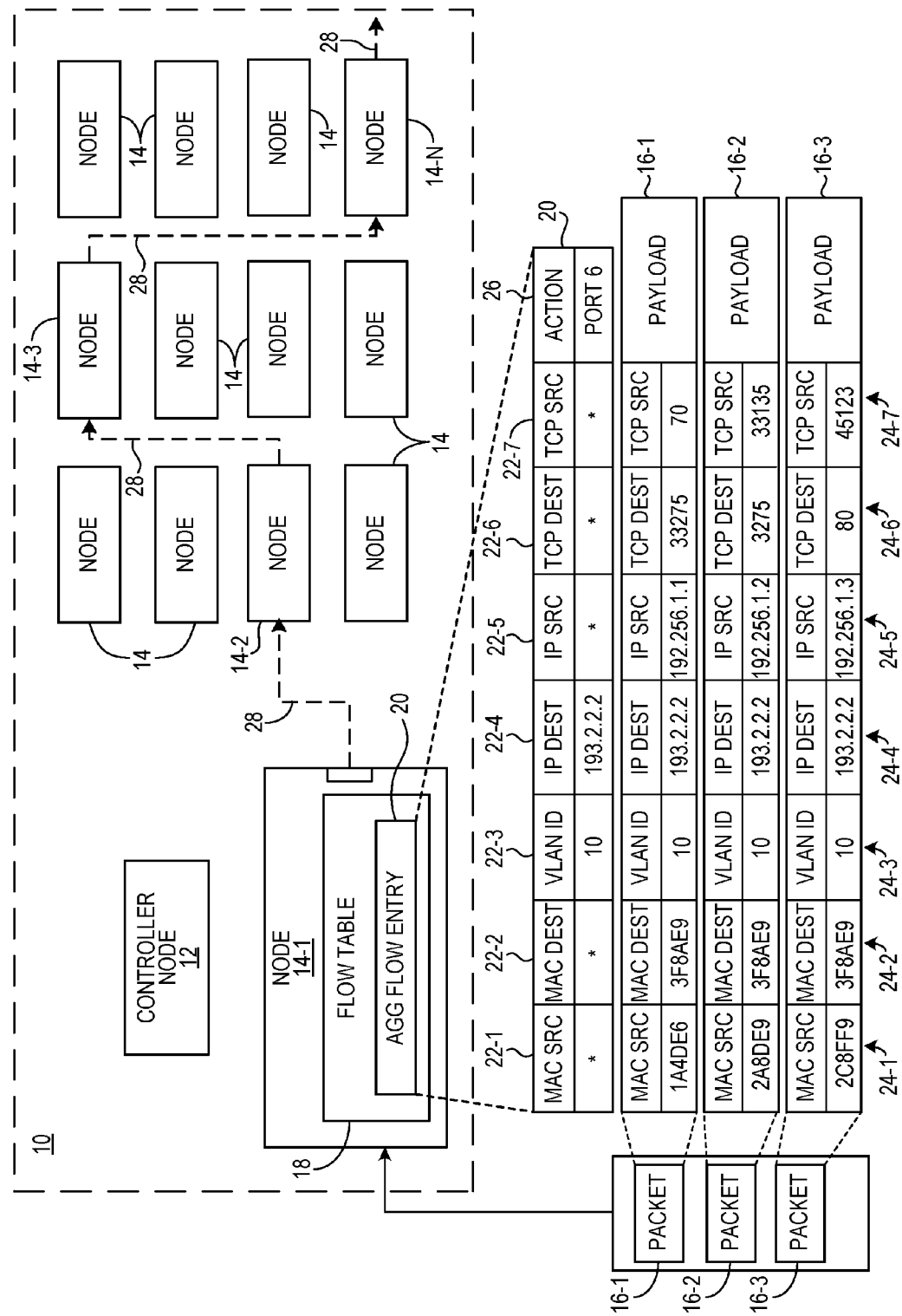
FIG. 1 is a block diagram of a network that has a centralized control plane networking architecture (CCPNA), wherein one or more controller nodes operate in conjunction with multiple datapath nodes to route packets through the network.

FIG. 1 is a block diagram of a network 10 that has a centralized control plane networking architecture (CCPNA), wherein one or more controller nodes 12 (only one controller node 12 illustrated for simplicity) operate in conjunction with multiple datapath nodes 14, 14-1-14-N (referred to generally hereinafter as "nodes 14") to route packets through the network 10. Although not shown for clarity purposes, the nodes 14 and the controller node 12 are communicatively coupled to one another, directly or indirectly, to facilitate communications with one another, and for purposes of routing packets through the nodes 14.

Generally, the controller node 12 includes control plane functionality, which may include, for example, path determination, Operation, Administration and Maintenance (OAM) functions, and the like. The nodes 14 include forwarding plane functionality, and once properly programmed, as discussed in greater detail herein, route packets that arrive at an ingress node 14 through the network 10 to an egress node 14.

Any node 14 that is connected to a node that is outside of the network 10, and which is capable of receiving a packet from the node outside of the network 10 may be an ingress node 14. The node outside of the network 10 may be a node in another network, or may be a source node that originates the packet. Any node 14 that is connected to a node that is outside of the network 10, and which is capable of sending a packet to the node outside of the network 10 may be an egress node 14. The node outside of the network 10 may be a node in another network, or may be a destination node that consumes the packet. In the embodiments discussed herein, solely for purposes of illustration, the node 14-1 will be discussed as being an ingress node with respect to packets 16-1-16-3 (generally, packets 16), and the node 14-N will be referred to an egress node with respect to such packets 16. However, in some networks any of the nodes 14 may be an ingress node 14 with respect to some packets, an egress node 14 with respect to other packets, or a node 14 in a path of nodes 14 between an ingress node 14 and an egress node 14 with respect to still other packets.

For purposes of illustration, the network 10 may be discussed in the context of a software-defined network (SDN) that adheres to one or more of the OpenFlow Switch Specifications, but the embodiments are not limited to an SDN network, and have applicability in any network implementation or architecture in which control is, or may be, centralized in one or more controller nodes, such as the controller node 12, and other nodes, such as the nodes 14, are responsible for forwarding packets through the network 10. In particular, the embodiments have applicability in the context of Open vSwitch Database Management Protocol (OVSDB) and OpenDaylight networks, as well as networks that utilize a combination of Network Configuration Protocol (NETCONF) and simple network management protocol (SNMP).

When a packet, such as the packet 16-1, is received by an ingress node, such as the node 14-1, the node 14-1 accesses a flow table 18 that contains one or more flow entries 20, and attempts to match the values contained in data fields 22-1-22-7 (generally, data fields 22) of the flow entry 20 with header information contained in corresponding header fields 24-1-24-7 (generally, header fields 24) of the packet 16-1. It should be noted that certain data fields 22 have been illustrated for purposes of discussion, but the data fields 22 may comprise any one or more fields of data that would be contained in the header of a particular packet being routed by the respective network.

One or more data fields 22 in the flow entry 20 may contain a wildcard designation that indicates any value contained within the corresponding header field 24 of a packet 16 will constitute a match, irrespective of the actual value. The designation may be any suitable indicator, and is illustrated in the figures discussed herein as an asterisk ("*"), as shown in the data fields 22-1, 22-2, 22-5-22-7. A flow entry 20 that contains such a data field 22 may be referred to herein as an aggregate flow entry 20, or a wildcard flow entry 20, because multiple different flows may match against such a data field 22, and thus result in an aggregate flow. Once the node 14 determines that the values of the header fields 24 match the values of a flow entry 20, the node 14 then performs the action or actions identified in an action field 26 of the flow entry 20. In this example, the action field 26 directs the node 14 to forward the packet 16-1 via a port 6, which in this example is communicatively coupled to the node 14-2. Each other node 14 will similarly have one or more flow tables 18, and flow entries 20, and the packet 16-1 will follow a path 28 through the network 10 that includes the ingress node 14-1, intermediate nodes 14-2, 14-3, and egress node 14-N. The egress node 14-N then forwards the packet 16-1 out of the network 10 to another node, such as a node in another network, or a destination node that consumes the packet 16-1.

Any additional packets 16, such as the packets 16-2, 16-3, which are processed by the node 14-1 and have values in the header fields 24 of such packets 16 that match the data fields 22 of the flow entry 20, will likewise be forwarded to the node 14-2 via the port 6. Thus, from the perspective of the node 14-1, even though the packets 16-1, 16-2, 16-3 each have different values in the header fields 24-1, 24-5-24-7, each of such packets 16 will be forwarded according to the flow entry 20, and are thus seen by the node 14-1 as a single flow. Each of such packets 16 may also be similarly forwarded along the path 28, or, one or more of such packets 16 may be routed differently by a downstream node 14 such that the packet 16 takes a different path than that of the packet 16-1. For example, the node 14-2 may have an aggregate flow entry in a flow table 18 (not illustrated), that further forwards received packets 16 based on a different criteria than that of the flow entry 20.

Figure 2A:
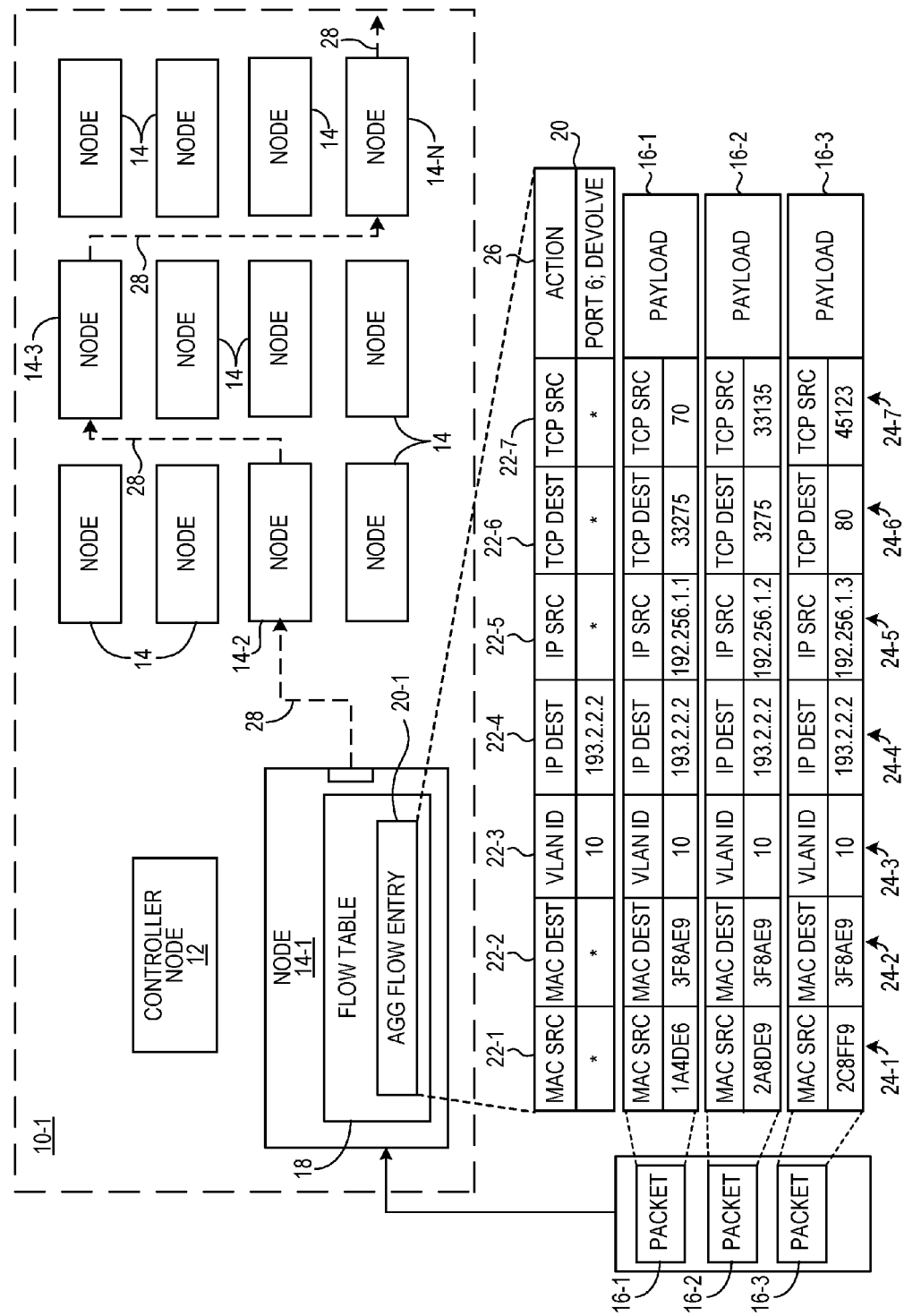
FIGS. 2A-2B are block diagrams of a network according to one embodiment.

FIG. 2A is a block diagram of a network 10-1 according to one embodiment. The network 10-1 is substantially similar to the network 10 illustrated in FIG. 1, except as otherwise discussed herein. In this embodiment, the action field 26 in an aggregate flow entry 20-1 includes a devolve action. The aggregate flow entry 20-1 and the devolve action may have been configured into the node 14-1 by the controller node 12, either automatically based on a process executing on the controller node 12, or in response to operator input at the controller node 12. In this embodiment, the node 14-1 processes the packet 16-1 and determines that the values of the header fields 24 of the packet 16-1 match the values in the data fields 22 of the aggregate flow entry 20-1, some by virtue of wildcard designations. The node 14-1 determines that the action field 26 identifies the devolve action. Based on the devolve action associated with the aggregate flow entry 20-1, the node 14-1 then generates a new flow, sometimes referred to herein as a microflow, based on the values in the header fields 24 of the packet 16-1.

Figure 2B:
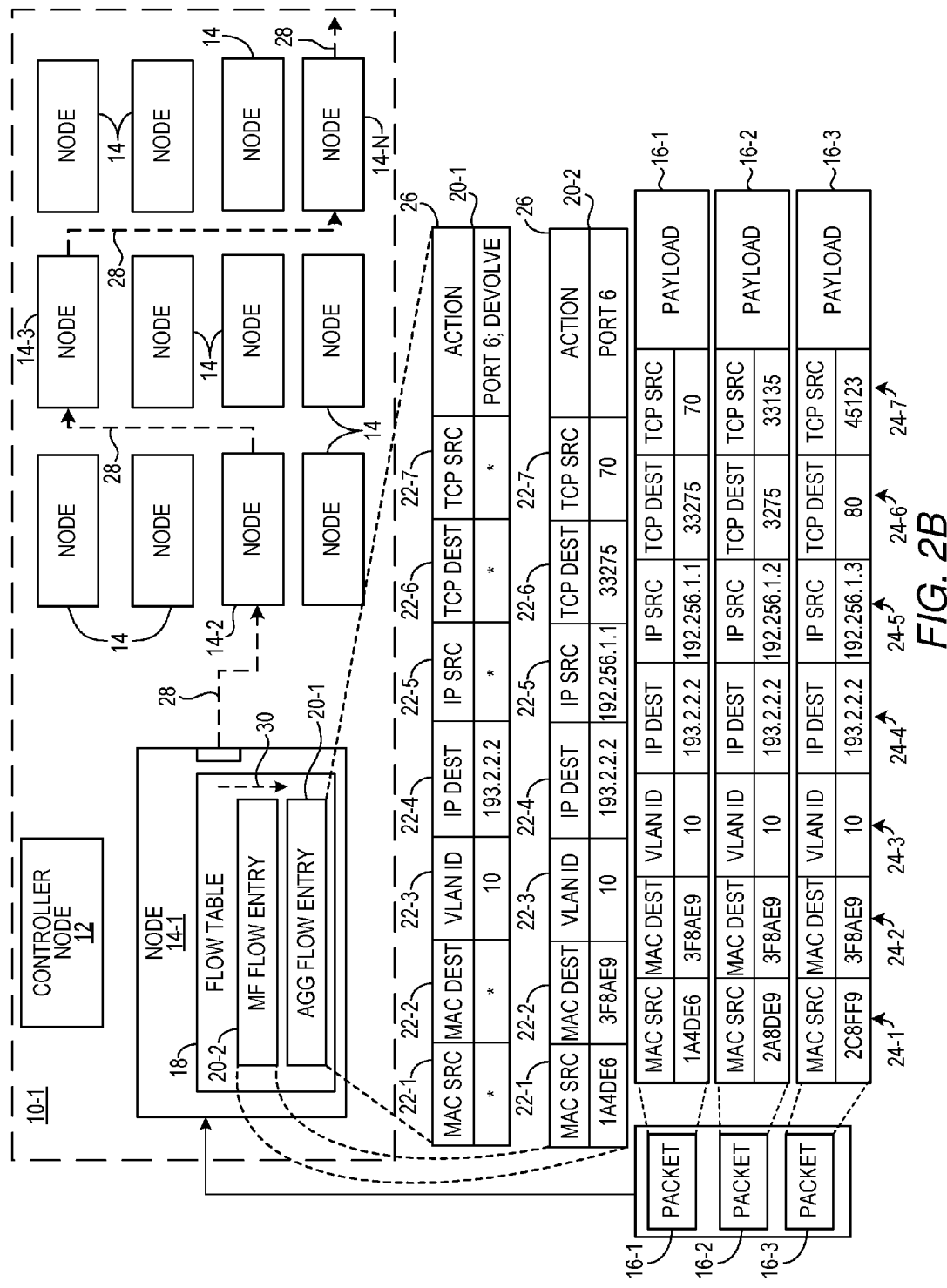

FIG. 2B is a block diagram of the network 10-1 illustrated in FIG. 2A after the node 14-1 has generated a new microflow based on the devolve action in the action field 26 and the header fields 24 of the packet 16-1. In particular, the node 14-1 generates a new microflow (MF) flow entry 20-2 that contains a plurality of data fields 22 that contain values extracted from corresponding header fields 24 of the packet 16-1. The node 14-1 has given the microflow flow entry 20-2 a higher flow matching priority 30 than that of the aggregate flow entry 20-1. The higher flow matching priority 30 ensures that when the node 14-1 processes future packets 16, the microflow flow entry 20-2 is matched against the header fields 24 of the packet 16 before the aggregate flow entry 20-1. As will be discussed in greater detail herein, at some point in time, the node 14-1 also sends the controller node 12 a microflow generation message that includes microflow generation information regarding the newly generated microflow, including, for example, the values contained in the data fields 22 of the microflow flow entry 20-2.

In a network 10-1 that utilizes an Internet Protocol Flow Information Export (IPFIX) protocol, a flow cache table may be maintained which represents a series of statistics about the incoming packets 16. The node 14-1 may implement an auto-devolving function in a router interface, which is triggered during a standard packet forwarding process based on route information base (RIB) information. When a packet 16 is forwarded because the packet 16 matches an entry that was configured as being auto-devolving, the auto-devolve function determines the active and inactive timeouts and inserts the flow in the IPFIX flow cache table of the router interface. In some embodiments, the initial inactive timeout may be configured relatively low, such that the flow expires if not selected due to microflow selection criterion, as discussed in greater detail below. Expired flows may be removed from the flow cache table by conventional IPFIX functionality.

The node 14-1 ultimately forwards the packet 16-1 via the port 6 to the node 14-2 in the path 28. The node 14-1 then processes the next packet 16-2 to arrive at the node 14-1. The node 14-1 accesses the microflow flow entry 20-2 by virtue of its higher flow matching priority 30 than that of the aggregate flow entry 20-1, and attempts to match the header fields 24 of the packet 16-2 against the data fields 22 of the microflow flow entry 20-2. The packet 16-2 is not a match because the values in the header fields 24-1, 24-5-24-7 of the packet 16-2 do not match the values in the data fields 22-1, 22-5-22-7 of the microflow flow entry 20-2. The node 14-1 accesses the aggregate flow entry 20-1 and attempts to match the header fields 24 of the packet 16-2 against the data fields 22 of the aggregate flow entry 20-1. Because the values in the header fields 24 match the values in the corresponding data fields 22 of the microflow flow entry 20-2, some by virtue of wildcard designations, the node 14-1 determines that the packet 16-2 matches the microflow flow entry 20-2. The node 14-1 may repeat the process described above with regard to the packet 16-1 and generate a new microflow flow entry (not illustrated) in the flow table 18 based on the header fields 24 of the packet 16-2. Substantially similar processing may occur with regard to the packet 16-3.

Figure 3:
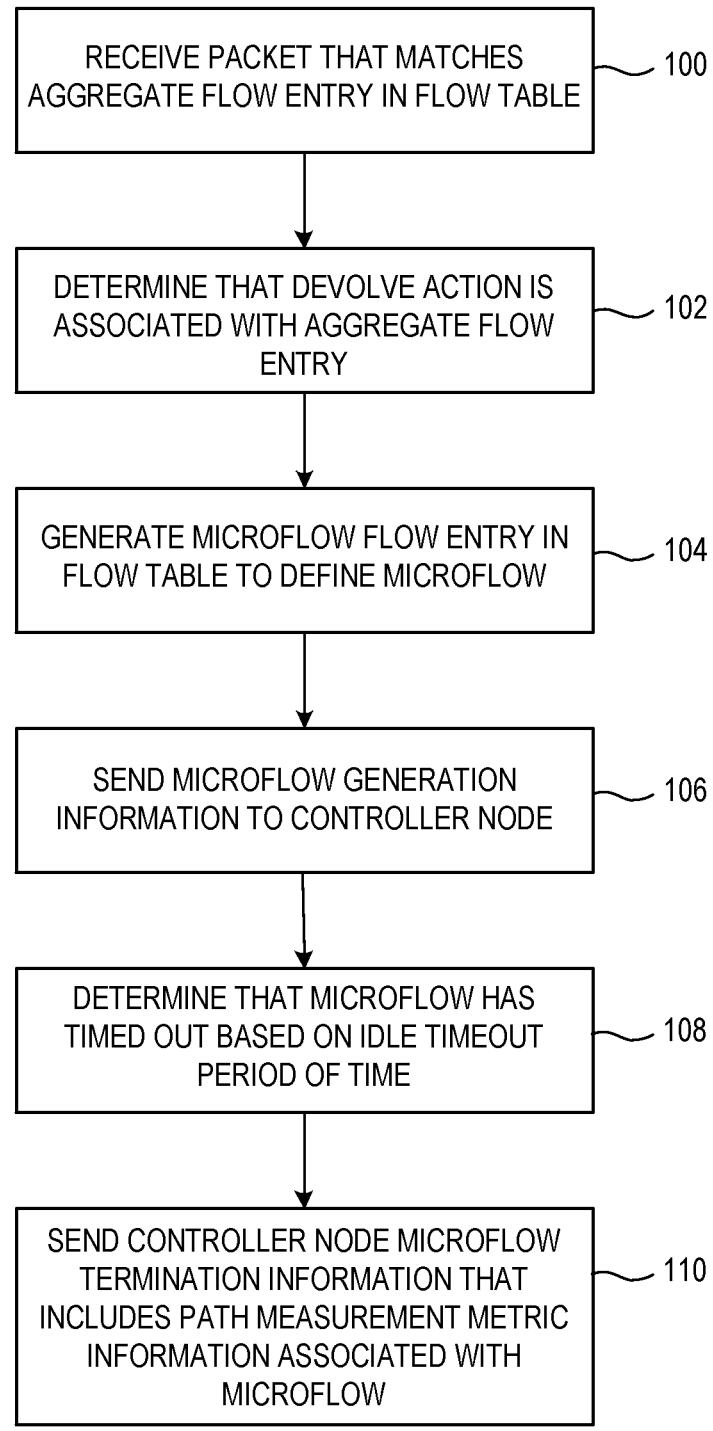
FIG. 3 is a flowchart of a method for automatically devolving a flow from an aggregate flow according to one embodiment.

FIG. 3 is a flowchart of a method for automatically devolving flows from an aggregate flow according to one embodiment. FIG. 3 will be discussed in conjunction with FIG. 2B. The node 14-1, sometimes referred to herein as an ingress node 14-1 as discussed above, receives the packet 16-1, and determines that the packet 16-1 matches the aggregate flow entry 20-1 in the flow table 18 (block 100). The node 14-1 determines that the devolve action is associated with the aggregate flow entry 20-1, based on, for example, the action field 26 (block 102). Based on the determination that the devolve action is associated with the aggregate flow entry 20-1, the node 14-1 generates the microflow flow entry 20-2 in the flow table 18 to define a microflow (block 104). The microflow flow entry 20-2 includes header information extracted from the packet 16-1 and an idle timeout identifier that identifies an idle timeout period of time for the microflow flow entry 20-2. The node 14-1 sends a microflow generation message to the controller node 12 that includes microflow generation information, such as the values of the header fields 24 of the packet 16-1, which identifies the microflow (block 106).

In an OpenFlow embodiment, the OpenFlow messaging protocol may be extended to notify the controller node 12 of selected microflows by the node 14-1. For each selected microflow, at least the flow definition (i.e., the values of the data fields 22) should be communicated to the controller node 12. A non-limiting example of a suitable structure is provided below:

```
struct microflow_notification {
    struct ofp_header header;
    uint64_t datapath_id;          /*Datapath unique ID*/
    uint8_t table_id;              /* ID of the table where the flow is
stored. */
    struct ofp_match match;   /* Flow data fields matching the
microflow.*/
    idle_timeout;   /* idle_timeout specified for the microflow
}
```

Ultimately, the node 14-1 determines that the microflow has timed out based on the idle timeout period of time (FIG. 3, block 108). In response to determining that the microflow has timed out, the node 14-1 sends the controller node 12 microflow termination information that includes path measurement metric information associated with the microflow (FIG. 3, block 110).

Figure 4:
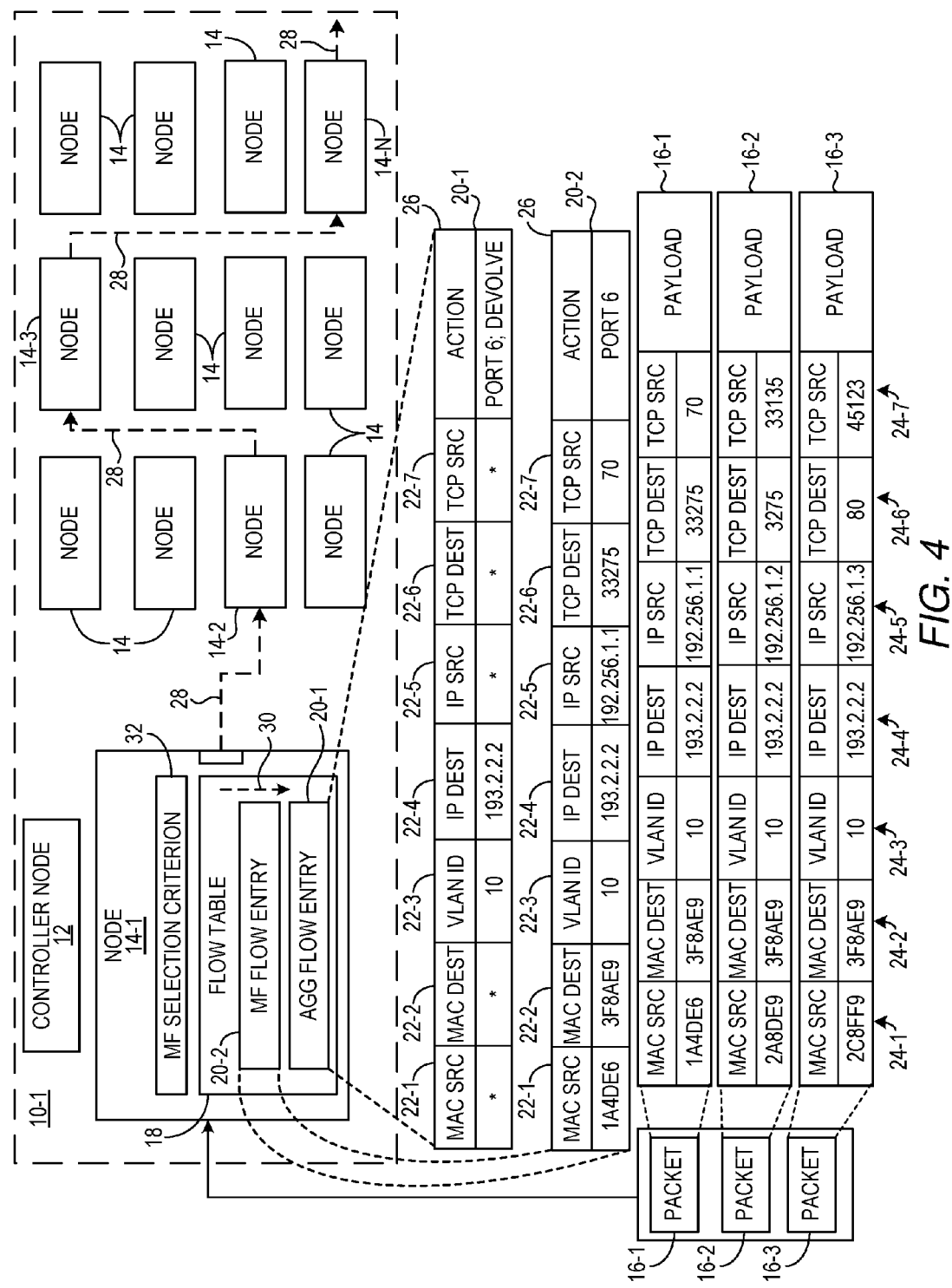
FIG. 4 is a block diagram of the network illustrated in FIG. 2A wherein a node further accesses one or more microflow selection criteria to determine whether to generate a new microflow according to one embodiment.

FIG. 4 is a block diagram of the network 10-1 illustrated in FIG. 2A wherein the node 14-1 further accesses one or more microflow selection criterion 32 to determine whether to generate a new microflow. The microflow selection criterion 32 may be operationally configured into the node 14-1, may be downloaded from a remote location by the node 14-1, or may be provided by the controller node 12. The microflow selection criterion 32 can comprise any desirable criteria for determining whether or not to devolve, or generate, a new microflow that would otherwise be aggregated into an aggregate flow, such as via the aggregate flow entry 20-1. By way of non-limiting example, the selection criterion may comprise a predetermined number of devolved microflows, and/or a predetermined number of devolved microflows per media access control (MAC) source address, MAC destination address, internet protocol (IP) source address, IP destination address, Virtual Private Network (VPN), Multiprotocol Label Switching (MPLS) label, destination port, or the like, as identified in the header fields 24 of a packet 16. The selection criterion may comprise any combination of criteria, such as a predetermined number of flows for a certain combination of an MPLS label and a MAC source address. The selection criteria may comprise ranges of possible values of one or more of the header fields 24 of a packet 16, including, by way of non-limiting example, ranges of source and or destination MAC addresses, ranges of source and/or destination IP addresses, ranges of port numbers, and the like. The selection criteria may comprise a predetermined number of random microflows over a predetermined period of time. In some embodiments, the node 14-1 may also have a particular amount of space allocated in the flow table 18 that limits a total number of microflow entries. If the total number of microflow entries is reached, the node 14-1 does not generate additional microflows until a microflow terminates. The amount of space for microflow entries may be identified per aggregate flow entry in some embodiments. The selection criterion may also be updated dynamically by the controller node 12 based on any other criteria, such as a determination that there are communication issues with a particular node 14, a particular path 28, or the like.

As an example, assume that the node 14-1 receives the packet 16-1, and determines that the packet 16-1 matches the aggregate flow entry 20-1. Assume that the microflow selection criterion 32 indicate that only one microflow per IP destination address is to be generated. The node 14-1 determines that no other flow entries 20 exist for the IP destination address identified in the header field 24-4 of the packet 16-1, and based on the devolve action identified in the aggregate flow entry 20-1 and the microflow selection criterion 32, generates the microflow flow entry 20-2.

The node 14-1 next processes the packet 16-2 and determines that the packet 16-2 does not match the microflow flow entry 20-2 but does match the aggregate flow entry 20-1. The node 14-1 determines that the action field 26 contains a devolve action, and accesses the microflow selection criterion 32. The microflow selection criterion 32 indicate that only one microflow per IP destination address is to be generated. The node 14-1 determines that the microflow defined by the microflow flow entry 20-2 contains the same IP destination address as that identified in the header field 24-4 of the packet 16-2 and thus, that a microflow for such IP destination address has already been devolved, and based on such determination, does not generate an additional flow entry 20. In this example, the determination to devolve a microflow is made concurrently with the determination of the microflow selection criterion 32. If the microflow selection criterion 32 is not met, the microflow is not devolved. In other embodiments, the microflow may be devolved automatically, but only reported to the controller node 12 after it is determined that the microflow selection criterion 32 is met. This may be particularly appropriate when the microflow selection criterion 32 cannot be determined until the microflow has been in existence for a period of time, such as a microflow selection criterion 32 that is based on a number of packets, amount of bandwidth, or other usage metric.

The node 14-1 next processes the packet 16-3 and determines that the packet 16-3 does not match the microflow flow entry 20-2 but does match the aggregate flow entry 20-1. The node 14-1 determines that the action field 26 contains a devolve action, and accesses the microflow selection criterion 32. The node 14-1 determines that the microflow defined by the microflow flow entry 20-2 contains the same IP destination address as that identified in the header field 24-4 of the packet 16-3 and thus, that a microflow for such IP destination address has already been devolved, and based on such determination, does not generate an additional flow entry 20.

In embodiments wherein the node 14-1 may be controlled by NETCONF and SNMP, if the microflow is selected, the data fields 22 of the flow entry 20 for the microflow may be used to create a managed object in a management information base (MIB).

Figure 5:
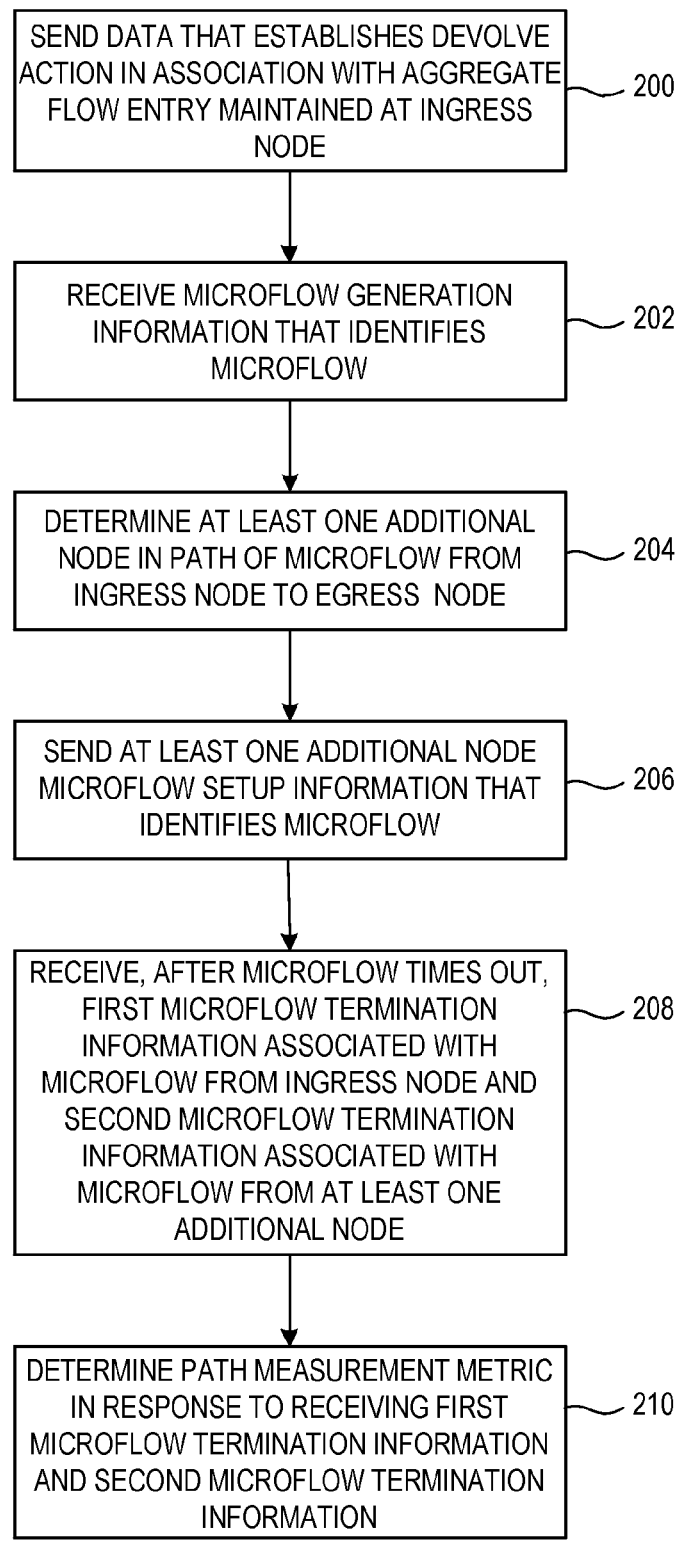
FIG. 5 is a flowchart of a method for generating a new microflow from the perspective of a controller node according to one embodiment.

FIG. 5 is a flowchart of a method for generating a new microflow from the perspective of the controller node 12 according to one embodiment. FIG. 5 will be discussed in conjunction with FIG. 4. The controller node 12 may initially send data that establishes the devolve action in association with the aggregate flow entry 20-1 maintained at the ingress node 14-1 (block 200). The data establishing the devolve action may be sent in conjunction with data establishing the aggregate flow entry 20-1, or separately. In some embodiments, the controller node 12 may also send microflow selection criterion 32 to the ingress node 14-1. The controller node 12 ultimately receives, from the ingress node 14-1, a microflow generation message that comprises microflow generation information that identifies a newly generated microflow (block 202). In some embodiments, the controller node 12 contains information regarding the flow entries of the flow tables 18 in each of the nodes 14, and thus is capable of determining the path 28 through the network 10-1 of any particular packet 16. Based on the microflow generation information, the controller node 12 then determines at least one additional node 14 in a path of the microflow from the ingress node 14-1 to an egress node, such as the node 14-N (block 204). For purposes of illustration, in this example, assume that the at least one additional node 14 is the egress node 14-N. The controller node 12 then sends the node 14-N microflow setup information that identifies the microflow (block 206).

The node 14-N then generates a flow entry and inserts the flow entry into a flow table of the node 14-N. The microflow setup information may also include an idle timeout identifier that identifies an idle timeout period of time that is to be used by the node 14-N to determine when the microflow times out. The microflow times out if no packet is received for the microflow for the idle timeout period of time. In some embodiments, as will be discussed in greater detail herein, the node 14-1 and the node 14-N may provide information regarding the microflow that may be used by the controller node 12 to determine performance metrics associated with the microflow, such as packet loss metrics, packet delay metrics, and the like. In such embodiments, the controller node 12 receives, after the microflow times out, first microflow termination information associated with the microflow from the ingress node 14-1 and second microflow termination information associated with the microflow from the at least one additional node 14-N (FIG. 5, block 208). The controller node 12 then determines a path measurement metric in response to receiving the first microflow termination information and the second microflow termination information (FIG. 5, block 210).

Figure 6A:
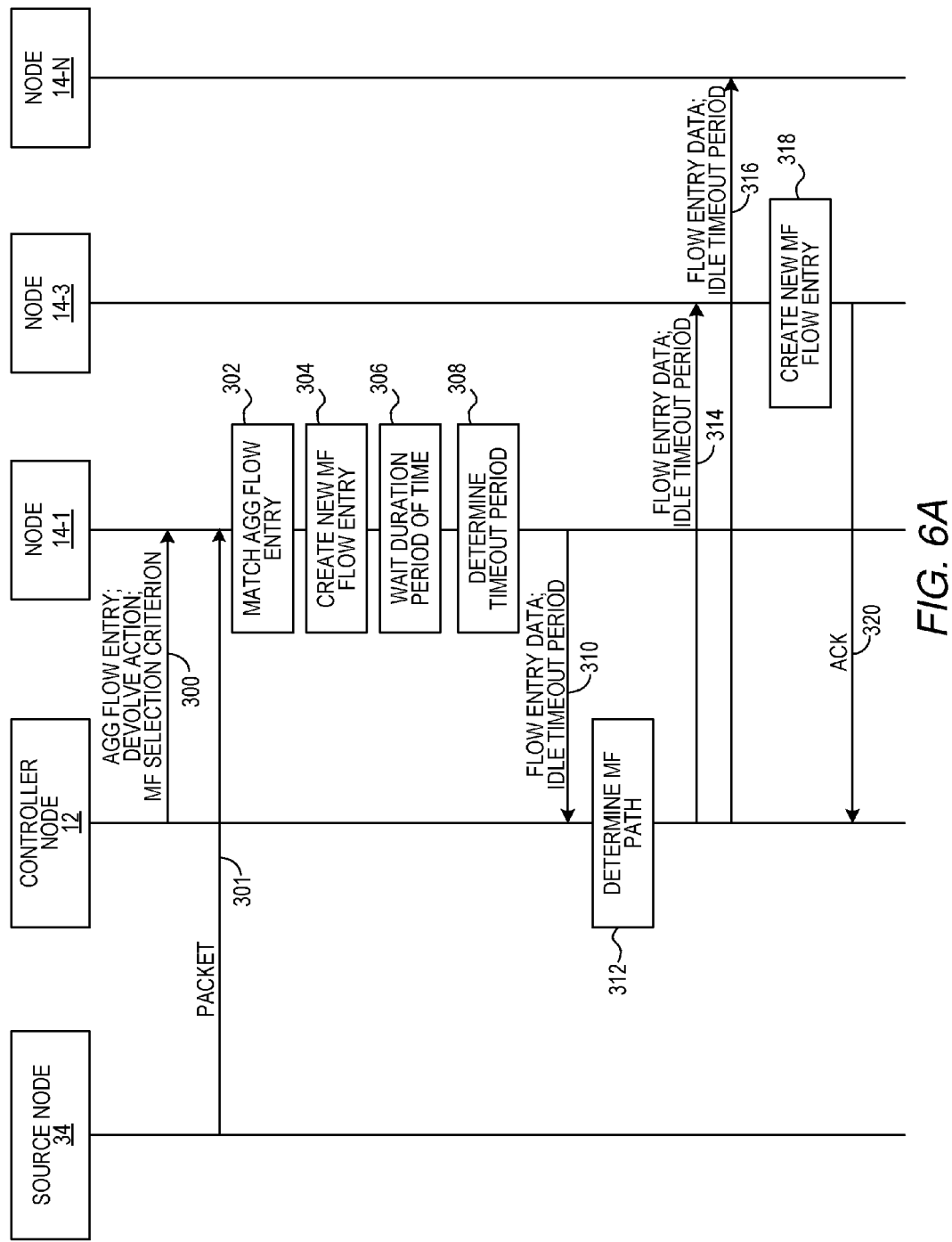
FIGS. 6A-6B are message flow diagrams that illustrate an example flow of messages, and corresponding actions, for setting up a microflow in a network according to one embodiment.
Figure 6B:
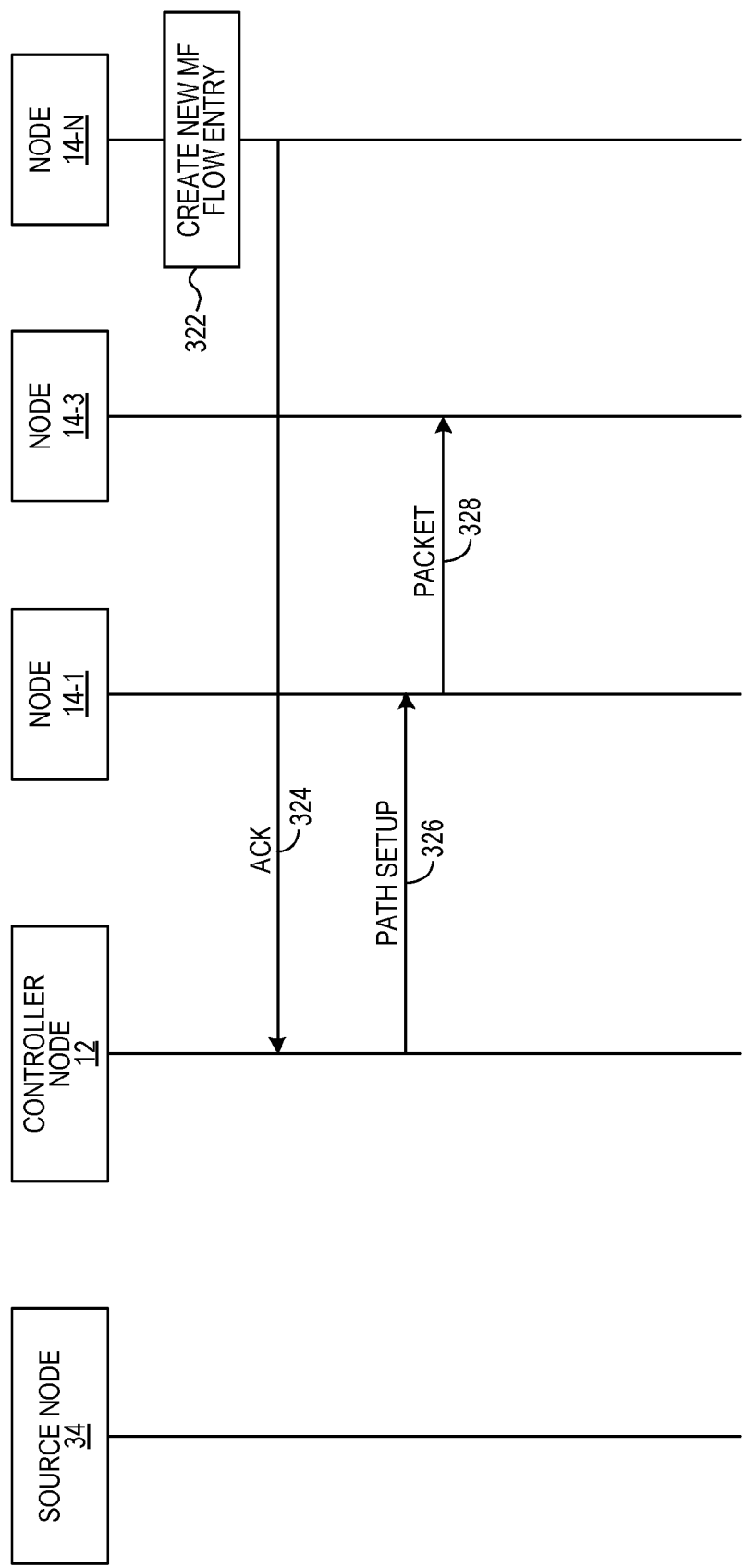

FIGS. 6A-6B are message flow diagrams that illustrate an example flow of messages, and corresponding actions, for setting up a microflow in the network 10-1 according to one embodiment. Initially, the controller node 12 sends one or more messages to the node 14-1 to set up an aggregate flow entry, associate the devolve action with the aggregate flow entry, and identify the microflow selection criteria for the node 14-1 to use in determining when to generate a new microflow (step 300). A source node 34 sends a packet to the node 14-1 (step 301). The node 14-1 determines that the packet matches the aggregate flow entry (step 302). Assume for purposes of illustration that the attributes of the packet fits within, or matches, the microflow selection criteria. The node 14-1 sets up a new microflow flow entry based on the devolve action and the microflow selection criteria (step 304). In some embodiments, the node 14-1 may optionally wait a period of time prior to notifying the controller node 12 about the new microflow (step 306). This eliminates overhead that would otherwise occur if the microflow is a short-lived, or transient flow. The wait period may comprise any suitable duration of time, such as, by way of non-limiting example, 10, 20 or 30 seconds.

The node 14-1 then determines an idle timeout period of time (step 308). The idle timeout period of time is a period of time that, if no packet has been received by the node 14-1 for such period of time, will cause the node 14-1 to terminate the microflow. The idle timeout period of time may be determined by the node 14-1 in any suitable manner. For example, the idle timeout period of time may be operationally configured into the node 14-1, or provided to the node 14-1 by the controller node 12 in response to the node 14-1 notifying the controller node 12 about the microflow, or determined otherwise.

The node 14-1 then sends microflow generation information that identifies the new microflow to the controller node 12 (step 310). The microflow generation information may comprise, for example, values contained in the data fields 22 (FIG. 4) of the flow entry that match header information in the packet. The microflow generation information may also include an idle timeout identifier that identifies the idle timeout period of time determined for the microflow. The controller node 12 receives the microflow generation information and determines the path of the microflow through the network (step 312). Assume for purposes of illustration that the path of the microflow through the network includes the nodes 14-3, 14-N. The node 14-3 may be referred to as an intermediate node 14-3 because the node 14-3 is between the ingress node 14-1 and the egress node 14-N in the path of the microflow. The controller node 12 sends the nodes 14-3, 14-N the microflow setup information and the idle timeout period of time (steps 314-316). The node 14-3 generates a new flow entry in a flow table of the node 14-3, and sends an acknowledgement (ACK) message to the controller node 12 indicating that the microflow has been setup in the node 14-3 (steps 3018-3020). Similarly, the node 14-N generates a new flow entry in a flow table of the node 14-N, and sends an ACK message to the controller node 12 indicating that the microflow has been setup in the node 14-N (steps 322, 324).

The controller node 12 may then send a path setup indication to the node 14-1 informing the node 14-1 that the microflow has been setup on downstream nodes 14 (step 326). In some embodiments, the node 14-1 may buffer the packet, and any additional packets received by the node 14-1 that would match the new microflow flow entry, until the node 14-1 receives the path setup indication from the controller node 12. Upon receipt of the path setup indication, the node 14-1 forwards the packets to the next node 14 in the path (step 328). This may facilitate more accurate metrics by the nodes 14 in the path, such as packet loss metrics.

If the network 10-1 utilizes the OVSDB protocol for control of the nodes 14, the controller node 12 may utilize the "insert" operation. Alternatively, the controller node 12 may utilize a NETCONF edit-configuration operation to create an associated Applications Performance Measurement (APM) Management Information Base (MIB) Flow Aggregation table entry. In a Route Information Base (RIB)/

Flow cache context, the controller node 12 may insert the microflow flow entry into the IPFIX cache of the nodes 14-3, 14-N.

In an OpenFlow embodiment, interactions between the controller node 12 and the ingress node 14-1 may be expanded to implement some of the functionality described herein. In one embodiment, configuration interactions may be extended to include a microflow selection criteria configuration, and an idle timeout period of time configuration. Various example of microflow section criteria are provided above. In one embodiment, the idle timeout period of time can be a static value configurable via the controller node 12. In one embodiment, the value of the idle timeout period of time can be inherited from the aggregate flow entry. The idle timeout period of time can also be a static default value configurable via the controller node 12. The idle timeout period of time can also be chosen individually for each microflow based on policies installed by the controller node 12.

Non-limiting examples of a microflow selection criteria configuration message and an idle timeout configuration message suitable for implementing the functionality discussed herein, according to one OpenFlow embodiment, are provided below:

```
enum selection_policy_type {
SELECT_ALL = 1 << 0; /* select all microflows for packet-loss
measurements */
SAMPLE_RANDOM = 1 << 1; /* select a random sample of
microflows*/
SAMPLE_IP_RANGE = 1 << 2; /* select a random sample of
microflows in specified IP number ranges */
SAMPLE_PORT_RANGE = 1 << 3; /* select a random sample
of microflows in specified TCP/UDP port number ranges */
};
    struct config_loss_node_all {
uint16_t type;    /* Type SELECT_ALL */
uint32_t idle_timeout;    /* Default idle_timeout for all microflows
*/
}
    struct config_loss_node_random {
uint16_t type;    /* Type SAMPLE_RANDOM */
uint8_t probability        /* Sampling probability p*/
uint32_t idle_timeout;    /* Default idle_timeout for all microflows
*/
}
    struct config_loss_IP_range {
uint16_t type;    /* Type SAMPLE_IP_RANGE */
uint8_t probability        /* Sampling probability p*/
enum range_type {
    source = 1 << 0;    /* the specified range target source
addresses */
    destination = 1 << 1;    /* the range targets destination
addresses */
};
uint8_t range_type r;
struct in_addr begin_range        /* First address of the IP range,
from which flows should be randomly selected */
struct in_addr end_range        /* Last address of the IP range
uint32_t idle_timeout;    /* Default idle_timeout for all microflows
*/
}
```

Figure 7:
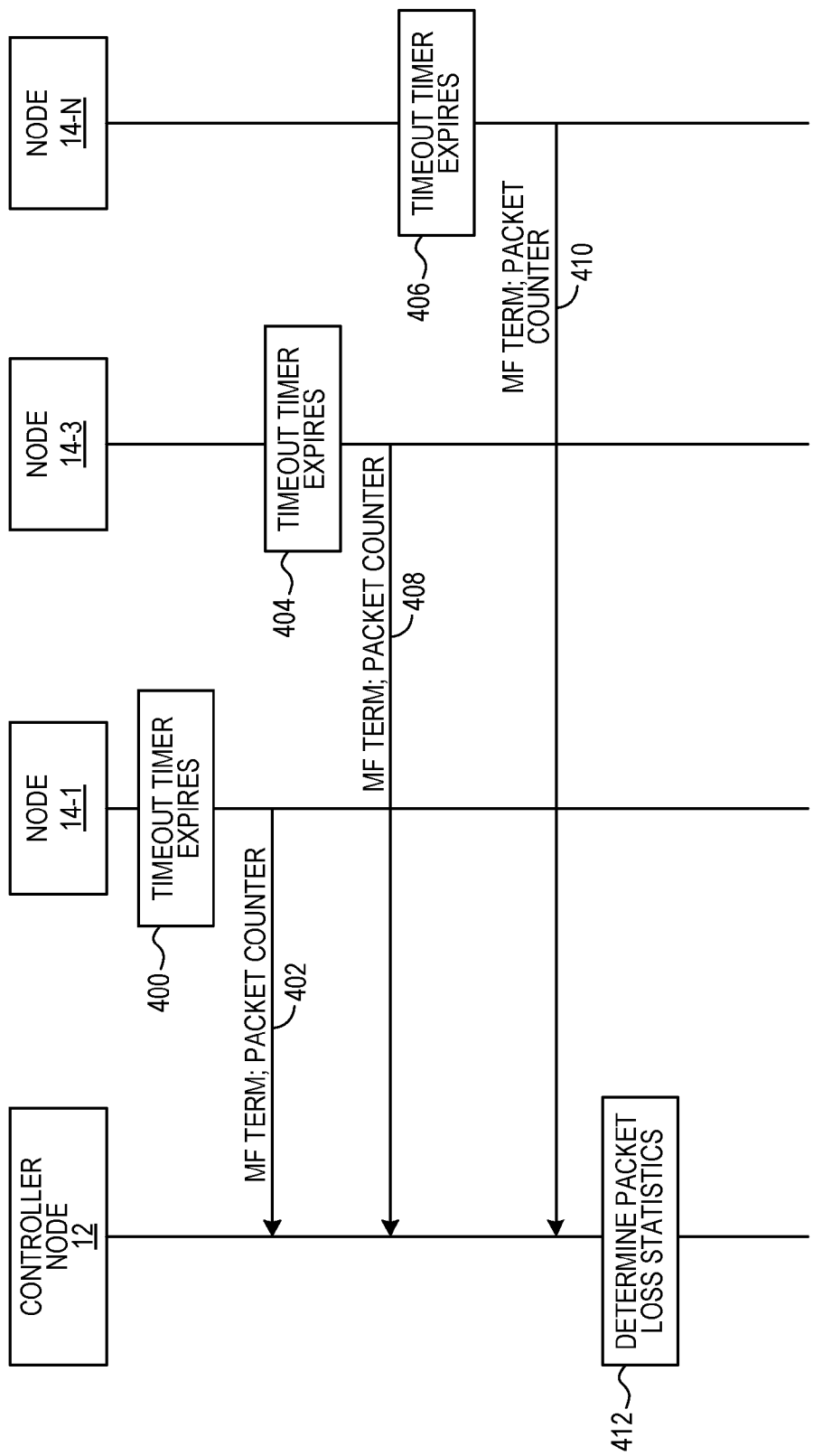
FIG. 7 is a message flow diagram illustrating the determination, by a controller node, of a packet loss metric for a microflow according to one embodiment.

FIG. 7 is a message flow diagram illustrating the determination, by the controller node 12, of a packet loss metric for a microflow, according to one embodiment. For purposes of illustration, assume that the process discussed in FIGS. 6A-6B has occurred. Also, assume that the nodes 14-1, 14-3, 14-N each maintained a packet counter for the microflow, and incremented the packet counter for each packet received by such nodes 14-1, 14-3, 14-N that matched the microflow flow entry in their respective flow tables. Each node 14-1, 14-3, 14-N also maintains a timer for the microflow that expires after the idle timeout period of time. Each node 14-1, 14-3, 14-N and resets its respective timer each time a packet that matches the microflow flow entry is received. Ultimately, no packet is received by the node 14-1 for the idle timeout period of time and the idle timeout timer expires (step 400). The node 14-1 accesses the packet counter and determines the packet count. The node 14-1 sends the controller node 12 microflow (MF) termination information indicating that the microflow has terminated and path measurement metric information comprising the packet count (step 402). Similarly, the idle timeout timers expire for the nodes 14-3, 14-N, each of which then accesses respective packet counters, and sends the controller node 12 microflow termination information indicating that the microflow has terminated, and path measurement metric information comprising the packet counts (steps 404-410). In an OpenFlow environment, the microflow termination information may comprise an OFPFF_SEND_FLOW_REM message. In some embodiments, the OpenFlow protocol may be expanded such that the OFPFF_SEND_FLOW_REM message includes the packet count.

The controller node 12 can then determine a variety of packet count metrics from the packet counts received from the nodes 14-1, 14-3, 14-N (step 412). The controller node 12 can use the packet count from the node 14-1 and the packet count from the node 14-3 to determine a packet loss metric on the communication link, or communication links, between the node 14-1 and the node 14-3. The controller node 12 can use the packet count from the node 14-1 and the packet count from the node 14-N to determine a packet loss metric on the path through the network. The controller node 12 can use the packet count from the node 14-3 and the packet count from the node 14-N to determine a packet loss metric on the communication link, or communication links, between the node 14-3 and the node 14-N.

In other contexts, such as an OVSDB context and/or a NETCONF/SNMP context, in lieu of an idle timeout timer, a microflow notification function may periodically sweep fast path flow tables, and if the microflow is not found, the microflow flow entry is removed from the OVSDB or APM tables, respectively. In OVSDB, if the microflow was generated with a monitor request, removal of the microflow flow entry from the OVSDB table will cause the generation of a notification to the controller node 12 automatically. In a NETCONF embodiment, the controller node 12 may subscribe to event notifications from the nodes 14, via, for example, SNMP. In a RIB/Flow context, the microflow termination information may be sent via the IPFIX protocol. In each of such contexts, the packet count information may be included in the message that informs the controller node 12 that the microflow has terminated.

Figure 8:
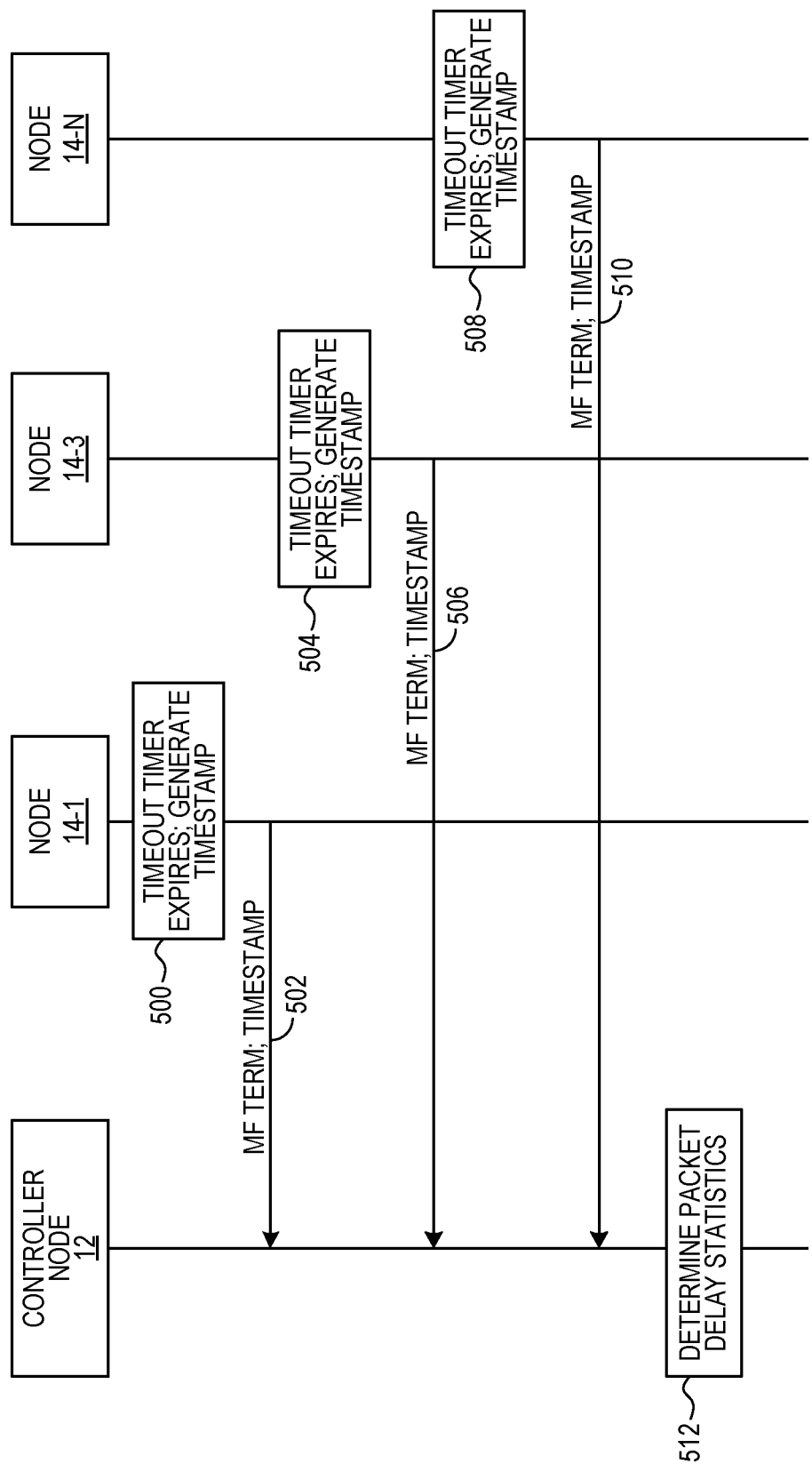
FIG. 8 is a message flow diagram illustrating the determination, by a controller node, of a packet delay metric for a microflow according to one embodiment.

FIG. 8 is a message flow diagram illustrating the determination, by the controller node 12, of a packet delay metric for a microflow. For purposes of illustration, assume that the process discussed in FIGS. 6A-6B has occurred. Also assume that the nodes 14-1, 14-3, 14-N each maintains a timer for the microflow that expires after the idle timeout period of time, and that the nodes 14-1, 14-3, 14-N are time synchronized with one another. Each node 14-1, 14-3, 14-N resets its respective timer each time a packet that matches the microflow flow entry is received. Ultimately, no packet is received by the node 14-1 for the idle timeout period of time and the idle timeout timer expires (step 500). Upon expiration of the idle timeout timer, the node 14-1 generates a timestamp, and sends the controller node 12 microflow termination information indicating that the microflow has terminated and path measurement metric information comprising the timestamp (step 502). Similarly, the idle timeout timers expire for the nodes 14-3, 14-N, each of which then generates a timestamp, and sends the controller node 12 microflow termination information indicating that the microflow has terminated, and path measurement metric information comprising the timestamp (steps 504-510). In an OpenFlow environment, the microflow termination information may comprise an OFPFF_SEND_FLOW_REM message. In some embodiments, the OpenFlow protocol may be expanded such that the OFPFF_SEND_FLOW_REM message includes the timestamp.

The controller node 12 can then determine a variety of packet delay metrics from the timestamps received from the nodes 14-1, 14-3, 14-N (step 512). The controller node 12 can use the timestamp from the node 14-1 and the timestamp from the node 14-3 to determine a packet delay metric on the communication link, or communication links, between the node 14-1 and the node 14-3. The controller node 12 can use the timestamp from the node 14-1 and the timestamp from the node 14-N to determine a packet delay metric on the path through the network. The controller node 12 can use the timestamp from the node 14-3 and the timestamp from the node 14-N to determine a packet delay metric on the communication link, or communication links, between the node 14-3 and the node 14-N.

In some embodiments, the nodes 14-1, 14-3, 14-N may not be time-synchronized with one another. In such embodiments, upon expiration of the idle timeout timer, the nodes 14-1, 14-3, 14-N may simply send the controller node 12 the microflow termination information. The controller node 12, upon receipt of each message containing the microflow termination information generates a timestamp. The controller node may also determine respective channel delays between the controller node 12 and the respective nodes 14-1, 14-3, 14-N, and factors in the determined channel delays with the generated timestamps to calculate packet delay metrics. The channel delays may be determined via any conventional mechanism, including, for example, the use of OpenFlow ECHO requests and replies between the controller node 12 and the respective nodes 14-1, 14-3, 14-N, and/or similar mechanisms in non-OpenFlow networks.

While for purposes of illustration the node 14-1 is shown as having only a single flow table 18, the embodiments are not so limited. In some embodiments, the nodes 14 may include a flow table pipeline that comprises a plurality of flow tables 18, such as may be utilized, by way of non-limiting example, in a network 10-1 that utilizes an OpenFlow 1.4 version architecture. In such embodiments, the auto-devolving functionality discussed herein may be applied to any such flow table 18 in the flow table pipeline. Preferably, instructions associated with an aggregate flow entry are inherited by any microflow flow entries, including, for example, "GOTO" instructions that identify the next flow table 18 in the flow table pipeline.

In such a flow table pipeline embodiment, the respective flow table 18 should support the data fields 22 suitable for implementing the devolved microflows. Thus, for example, where a flow table 18 in a flow table pipeline directs aggregate flows based on a single data field 22, and microflows are devolved from such flows based on four data fields 22, such flow table 18 should include support for storing the four data fields 22 for identifying the devolved microflows. In an OpenFlow context, this may be accomplished, in one embodiment, through an ofp_table_features request by setting an appropriate ofp_table_feature_prop_type OFPT-FPT_MATCH.

While the controller node 12 may be implemented in any type of hardware or any combination of hardware and software, FIG. 9 is a block diagram of the controller node 12 according to one embodiment. The controller node 12 includes, for example, a transceiver 40 and a processor device 42. The transceiver 40 generally includes components configured to facilitate sending and receiving data to and from other nodes, such as the nodes 14. Of course, the detailed operation for the transceiver 40 and the processor device 42 will vary depending on both the particular implementation and the standard or standards supported by the controller node 12. Those skilled in the art will appreciate that the block diagram of the controller node 12 necessarily omits numerous features that are not necessary to a complete understanding of this disclosure. Although all of the details of the processor device 42 are not illustrated, the processor device 42 comprises one or several general-purpose or special-purpose processors or other microcontrollers programmed with suitable software programming instructions and/or firmware to carry out some or all of the functionality of the controller node 12 described herein. In addition, or alternatively, the processor device 42 comprises various digital hardware blocks (e.g., one or more Application Specific Integrated Circuits (ASICs), one or more off-the-shelf digital or analog hardware components, or a combination thereof) configured to carry out some or all of the functionality of the controller node 12 described herein.

The controller node 12 may also include one or more storage media 44 and a memory 46 for storing data necessary and/or suitable for implementing the functionality described herein, as well as for storing complex programming instructions which, when executed on the processor device 42, may implement all or part of the functionality described herein. One embodiment of the disclosure may be implemented as a computer program product that is stored on a computer-readable storage medium, the computer program product including complex programming instructions that are configured to cause the processor device 42 to carry out the steps described herein. In one embodiment, a carrier containing the computer program is provided, wherein the carrier is one of an electronic signal, an optical signal, a radio signal, or the computer readable storage medium (e.g., a non-transitory computer readable medium).

FIG. 10 is a functional block diagram of the controller node 12 according to one embodiment. While the functionality of the controller node 12 discussed herein may be implemented in any number of modules, dependent on desired design criteria, in one embodiment, the controller node 12 includes a devolvement action module 50 configured to instruct the node 14-1 to automatically devolve microflows from one or more aggregate flows. A microflow downstream node determination module 52 is configured to determine a downstream node 14 upon notification of a microflow from the node 14-1. A downstream node communication module 54 is configured to notify a downstream node 14 in a path of a microflow about the newly generated microflow. A performance metric determination module 56 is configured to determine appropriate metrics, such as a packet loss metric, and/or a packet delay metric, upon notification of the termination of a microflow. In some embodiments, each of such modules 50-56 may be implemented in software that is executed by one or more processor devices 42 of the controller node 12 to provide the functionality described herein. While not illustrated, the controller node 12 may include any additional modules suitable or appropriate for implementing the functionality described herein.

While the node 14-1 may be implemented in any type of hardware or any combination of hardware and software, FIG. 11 is a block diagram of the node 14-1 according to one embodiment. The node 14-1 includes, for example, a transceiver 60 and a processor device 62. The transceiver 60 generally includes components configured to facilitate sending and receiving data to and from other nodes, such as the nodes 14 and the controller node 12. The detailed operation for the transceiver 60 and the processor device 62 may vary depending on both the particular implementation and the standard or standards supported by the node 14-1. Those skilled in the art will appreciate that the block diagram of the node 14-1 necessarily omits numerous features that are not necessary to a complete understanding of this disclosure. Although all of the details of the processor device 62 are not illustrated, the processor device 62 comprises one or several general-purpose or special-purpose processors or other microcontrollers programmed with suitable software programming instructions and/or firmware to carry out some or all of the functionality of the node 14-1 described herein. In addition, or alternatively, the processor device 62 comprises various digital hardware blocks (e.g., one or more ASICs, one or more off-the-shelf digital or analog hardware components, or a combination thereof) configured to carry out some or all of the functionality of the node 14-1 described herein.

The node 14-1 may also include one or more storage media 64 and a memory 66 for storing data necessary and/or suitable for implementing the functionality described herein, as well as for storing complex programming instructions which, when executed on the processor device 62, may implement all or part of the functionality described herein. One embodiment of the disclosure may be implemented as a computer program product that is stored on a computer-readable storage medium, the computer program product including complex programming instructions that are configured to cause the processor device 62 to carry out the steps described herein. In one embodiment, a carrier containing the computer program is provided, wherein the carrier is one of an electronic signal, an optical signal, a radio signal, or the computer readable storage medium (e.g., a non-transitory computer readable storage medium).

FIG. 12 is a functional block diagram of the node 14-1 according to one embodiment. While the functionality of the node 14-1 discussed herein may be implemented in any number of modules, dependent on desired design criteria, in one embodiment, the node 14-1 includes a packet processing module 68 configured to receive packets from other nodes, and analyze such packets. A microflow generation module 70 is configured to devolve a microflow from an aggregate flow rule. A microflow selection module 72 is configured to determine, based on microflow selection criteria, whether a microflow should be devolved. A microflow communication module 74 is configured to notify the controller node 12 about a new microflow. In some embodiments, each of such modules 68-74 may be implemented in software that is executed by one or more processor devices 62 of the node 14-1 to provide the functionality described herein. While not illustrated, the node 14-1 may include any additional modules suitable or appropriate for implementing the functionality described herein.

The following acronyms are used throughout this disclosure:
ACK Acknowledgement
APM Applications Performance Measurement
ASICs Application Specific Integrated Circuits
CCPNA Centralized Control Plane Networking Architecture
IP Internet Protocol
IPFIX Internet Protocol Flow Information Export
MAC Media Access Control
MF Microflow
MIB Management Information Base
MPLS Multiprotocol Label Switching Label
NETCONF Network Configuration Protocol
OAM Operation, Administration and Maintenance
OVSDB Open vSwitch Database Management Protocol
RIB Route Information Base
SDN Software-defined Network
SNMP Simple Network Management Protocol
VPN Virtual Private Network Those skilled in the art will recognize improvements and modifications to the embodiments of the disclosure. All such improvements and modifications are considered within the scope of the concepts disclosed herein and the claims that follow.

What is claimed is:

1. A method for notifying a controller node about a new microflow, comprising:
receiving, by an ingress node, a packet that matches an aggregate flow entry in a flow table;
determining that a devolve action is associated with the aggregate flow entry;
based on determining that the devolve action is associated with the aggregate flow entry, generating a microflow flow entry in the flow table to define a microflow, the microflow flow entry including header information extracted from the packet and an idle timeout identifier that identifies an idle timeout period of time for the microflow flow entry;
sending microflow generation information that identifies the microflow to the controller node;
determining that the microflow has timed out based on the idle timeout period of time; and
in response to determining that the microflow has timed out, sending the controller node microflow termination information that includes path measurement metric information associated with the microflow.

2. The method of claim 1, wherein the microflow generation information includes at least some of the header information extracted from the packet.

3. The method of claim 1, further comprising designating the microflow flow entry a higher flow matching priority than a flow matching priority associated with the aggregate flow entry.

4. The method of claim 1, further comprising:
receiving, from the controller node, a microflow selection criterion; and
wherein generating the microflow flow entry in the flow table further comprises generating the microflow flow entry based on determining that the devolve action is associated with the aggregate flow entry and based on the microflow selection criterion.

5. The method of claim 1, further comprising:
monitoring the microflow for a predetermined amount of time prior to sending the microflow generation information to the controller node.

6. The method of claim 1, further comprising:
buffering the packet in a memory;
receiving a path setup indication from the controller node that a downstream node in a path the packet will traverse has been informed about the microflow; and releasing the packet to a next node in the path in response to receiving the path setup indication.

7. The method of claim 6, further comprising:
receiving a plurality of packets in the microflow prior to receiving the path setup indication;
buffering the plurality of packets in the memory; and
releasing the plurality of packets to the next node in the path in response to receiving the path setup indication.

8. The method of claim 1, further comprising:
maintaining, by the ingress node, a packet counter for the microflow;
maintaining a count of packets associated with the microflow received by the ingress node in the packet counter; and
wherein the path measurement metric information comprises the packet counter.

9. The method of claim 8, further comprising:
generating a timestamp in response to determining that the microflow has timed out; and
wherein the path measurement metric information comprises the timestamp.

10. The method of claim 1, further comprising:
determining the idle timeout period of time associated with the microflow; and
inserting the idle timeout identifier that identifies the idle timeout period of time in the microflow generation information.

11. A method, comprising:
sending, by a controller node comprising a processor device to an ingress node, data that establishes a devolve action in association with an aggregate flow entry maintained at the ingress node;
receiving, by the controller node from the ingress node, microflow generation information that identifies a microflow;
determining at least one additional node in a path of the microflow from the ingress node to an egress node;
sending microflow setup information that identifies the microflow to the at least one additional node;
receiving, after the microflow times out, first microflow termination information associated with the microflow from the ingress node and second microflow termination information associated with the microflow from the at least one additional node; and
determining a path measurement metric in response to receiving the first microflow termination information and the second microflow termination information.

12. The method of claim 11, wherein the microflow generation information comprises an idle timeout identifier that identifies an idle timeout period of time, and further comprising:
sending the idle timeout identifier to the at least one additional node in the microflow setup information.

13. The method of claim 11, wherein the at least one additional node comprises a plurality of additional nodes, and further comprising sending the microflow setup information that identifies the microflow to each of the plurality of additional nodes.

14. The method of claim 11, wherein the first microflow termination information comprises a first packet counter identifying a first number of packets associated with the microflow received by the ingress node, the second microflow termination information comprises a second packet counter identifying a second number of packets associated with the microflow received by the at least one additional node, and further comprising determining a packet loss metric based on the first packet counter and the second packet counter.

15. The method of claim 11, wherein the first microflow termination information comprises a first timestamp, the second microflow termination information comprises a second timestamp, and further comprising determining a packet delay metric based on the first timestamp and the second timestamp.

16. The method of claim 11, further comprising:
generating, by the controller node, a first timestamp in response to receiving the first microflow termination information from the ingress node;
generating, by the controller node, a second timestamp in response to receiving the second microflow termination information from the at least one additional node;
determining a first channel delay associated with a first channel between the controller node and the ingress node;
determining a second channel delay associated with a second channel between the controller node and the at least one additional node; and
determining a packet delay metric based on the first timestamp, the first channel delay, the second timestamp, and the second channel delay.

17. The method of claim 11, further comprising sending, to the ingress node, a microflow selection criterion that identifies a criterion for defining the microflow.

18. The method of claim 11, wherein the first microflow termination information includes a first timestamp, the second microflow termination information includes a second timestamp, and further comprising:
receiving, from an intermediate node in the path that is downstream of the ingress node and upstream of the at least one additional node, third microflow termination information that includes a third timestamp;
determining a first packet delay metric between the ingress node and the intermediate node based on the first timestamp and the third timestamp; and
determining a second packet delay metric between the intermediate node and the at least one additional node based on the second timestamp and the third timestamp.

19. A computer program product for notifying a controller node about a microflow, the computer program product stored on a non-transitory computer-readable storage medium and including instructions configured to cause a processor device to carry out the steps of:
receiving, by an ingress node, a packet that matches an aggregate flow entry in a flow table;
determining that a devolve action is associated with the aggregate flow entry;
based on determining that the devolve action is associated with the aggregate flow entry, generating a microflow flow entry in the flow table to define a microflow, the microflow flow entry including header information extracted from the packet and an idle timeout identifier that identifies an idle timeout period of time for the microflow flow entry;
sending microflow generation information that identifies the microflow to the controller node;
determining that the microflow has timed out based on the idle timeout period of time; and
in response to determining that the microflow has timed out, sending the controller node microflow termination information that includes path measurement metric information associated with the microflow.

20. A computer program product stored on a non-transitory computer-readable storage medium and including instructions configured to cause a processor device to carry out the steps of:
sending, by a controller node to an ingress node, data that establishes a devolve action in association with an aggregate flow entry maintained at the ingress node;
receiving, by the controller node from the ingress node, microflow generation information that identifies a microflow;
determining at least one additional node in a path of the microflow from the ingress node to an egress node; and
sending microflow setup information that identifies the microflow to the at least one additional node;
receiving, after the microflow times out, first microflow termination information associated with the microflow from the ingress node and second microflow termination information associated with the microflow from the at least one additional node; and
determining a path measurement metric in response to receiving the first microflow termination information and the second microflow termination information.

21. A node, comprising:
a transceiver configured to communicate with a network; and
a processor device coupled to the transceiver and configured to:
receive a packet that matches an aggregate flow entry in a flow table;
determine that a devolve action is associated with the aggregate flow entry;
based on determining that the devolve action is associated with the aggregate flow entry, generate a microflow flow entry in the flow table to define a microflow, the microflow flow entry including header information extracted from the packet and an idle timeout identifier that identifies an idle timeout period of time for the microflow flow entry;
send microflow generation information that identifies the microflow to a controller node;
determine that the microflow has timed out based on the idle timeout period of time; and
in response to determining that the microflow has timed out, send the controller node microflow termination information that includes path measurement metric information associated with the microflow.

22. A node, comprising:
a transceiver configured to communicate with a network; and
a processor device coupled to the transceiver and configured to:
send, to an ingress node, data that establishes a devolve action in association with an aggregate flow entry maintained at the ingress node;
receive, from the ingress node, microflow generation information that identifies a microflow;
determine at least one additional node in a path of the microflow from the ingress node to an egress node;
send microflow setup information that identifies the microflow to the at least one additional node;
receive, after the microflow times out, first microflow termination information associated with the microflow from the ingress node and second microflow termination information associated with the microflow from the at least one additional node; and
determine a path measurement metric in response to receiving the first microflow termination information and the second microflow termination information.

* * * * *